United States Patent
Gebeshuber et al

[11] 3,824,843
[45] July 23, 1974

[54] DEVICE FOR HOLDING TEST HEAD

[75] Inventors: Johann Gebeshuber; Wilhelm Meusel, both of Nurnberg, Germany

[73] Assignee: Maschinefabrik Augsburg-Nurnberg, Aktiengesellschaft Werk Nurnberg, Nurnberg, Germany

[22] Filed: Oct. 25, 1972

[21] Appl. No.: 300,721

[30] Foreign Application Priority Data
Oct. 27, 1971  Germany............................ 2153397

[52] U.S. Cl............................73/71.5 US, 310/8.7
[51] Int. Cl. .......................................... G01n 29/04
[58] Field of Search............ 73/67.8 R, 67.8 S, 67.9, 73/71.5 US; 310/8.7

[56] References Cited
UNITED STATES PATENTS

| | | | |
|---|---|---|---|
| 2,666,862 | 1/1954 | Branson ........................ | 73/71.5 UX |
| 3,257,843 | 6/1966 | Cowan ............................ | 73/71.5 U |
| 3,721,118 | 3/1973 | Jeffras.............................. | 73/75.5 U |

FOREIGN PATENTS OR APPLICATIONS

| | | | |
|---|---|---|---|
| 145,047 | 6/1962 | U.S.S.R............................ | 73/71.5 U |

OTHER PUBLICATIONS

A. P. Rogel et al., A New Concept in Immersion Ultrasonics, Materials Evaluation, May 1968, pp. 83–89.

An Automatic Tank for Inspecting Turbine Rotor Blanks, Ultrasonics, April–June 1964, pp. 90-91.

*Primary Examiner*—Richard C. Queisser
*Assistant Examiner*—John P. Beauchamp
*Attorney, Agent, or Firm*—Walter Becker

[57] ABSTRACT

A device for holding a test head, especially a head for ultrasonic testing in which a resiliently extensible but nonrotatable beam structure has one part connected to a support, while at the free end of the beam there is a yoke to which a cardanic holding member is pivotally connected on a first axis which is perpendicular to the longitudinal axis of the beam and with the holding member adapted for supporting the test head on an axis perpendicular to the axis of the beam and also perpendicular to the axis on which the holding member is pivoted to the yoke.

6 Claims, 2 Drawing Figures

DEVICE FOR HOLDING TEST HEAD

The present invention relates to a holding device for ultrasound test heads for testing spherical or saddle surfaces on pipe connections of containers, especially of the marginal zones of inlet and outlet connections on reactor containers for water under pressure and boiling water, the reactor containers being connectable to a manipulator.

With pressure containers and especially with reactor containers for water under pressure and boiling water, it is necessary, in order to assure a sufficient safety, not only to check such containers after they are finished merely once thoroughly for any possible flaws in the structure and in the welding seams, but such containers must during their operation be checked again and again at certain intervals for possible damages which occurred or are occurring during operation so that these damages can be repaired in time and the container can be taken out of operation in time.

Such checks and repeat checks are customarily effected from the interior of the containers by means of ultrasound test heads while the containers remain almost always filled with water. Inasmuch as the test heads must be moved along the entire container wall, so-called manipulators are employed which are devices onto which the test heads are built and which are so designed that checks will be carried out systematically. To make sure that the test head will always be able to follow the respective shape of the wall, for instance a cylindrical container wall or the arched bottom of the container, it is known between the test head and the manipulator to provide specially designed test head holders which permit the test head precisely to follow the contour of the walls to be checked. It is particularly difficult to check the socalled saddle surfaces of the inlet and outlet connections in the container because in this instance the test head must carry out a three-dimensional motion while nevertheless continuously engaging the wall.

It is an object of the present invention to provide a test head holder which with saddle and spherical surfaces will assure an automatic and proper contact of the test head with these surfaces and will also be able without difficulties to work underwater.

This object and other objects and advantages of the invention will appear more clearly from the following specification in connection with the accompanying drawings, in which.

Figure 1:
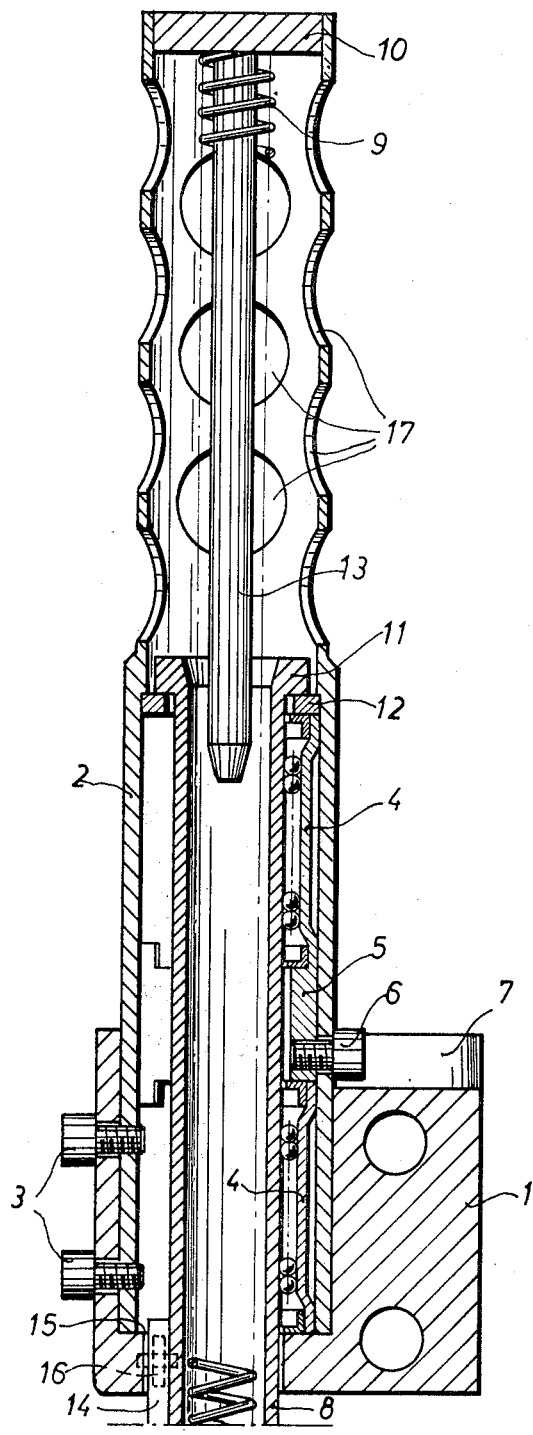
FIG. 1 shows a telescopic beam according to the invention.

The holding device according to the present invention is characterized primarily by a beam which is connectable to a manipulator and is telescopically movable in the direction toward the respective wall to be checked. The beam which is resiliently movable is provided with a one-piece yoke which is rigidly connected to the beam while a cardan member is linked to the free end of the yoke and connects the ultrasound test head cardanically to the beam which is telescopically movable inwardly and outwardly.

The resiliently outwardly movable beam serves for always pressing the ultrasound test head against the wall to be checked, while it adapts itself easily to any elevations and depressions. By employing a one-piece yoke which does not project far laterally, above all an easier testing possibility and a better pivoting or tilting possibility of the test head will be obtained. The cardan member makes it possible, as already implied by its name, that the test head can adapt itself in all directions to the respective contour of the wall to be checked and that it will always contact the wall over a surface. In this way all requirements to be met by such test head holder are being met.

More specifically, it is suggested according to the present invention to hold the telescopic beam in the direction of its maximum projection by the force of a pressure spring which is as long as possible and has a flat line of characteristic, in order to assure with all possible spacing a pressure force for the test head which will be as uniform as possible. The beam itself consists primarily of a receiving pipe which is rigidly connected to a connecting flange for the manipulator and also consists of a beam pipe which is displaceable in the receiving pipe but is not rotatably mounted and which is provided with a one-piece yoke. The inner wall of the beam pipe together with a guiding bolt arranged at the other end of the receiving pipe forms the radial guiding means for the long pressure spring so that the latter cannot be clamped fast or jammed. In order to assure that the displacement of the beam pipe will in each instance, especially with underwater operation, always be easily movable so that a uniform adjusting force is maintained, the beam pipe is guided in one or more ball bushings firmly arranged in the receiving pipe or is guided in antifriction bearings which are arranged in a star-shaped manner. To avoid a distortion of the beam pipe, the latter is equipped with an adjusting spring which has at least the length of the maximum stroke of the beam pipe. There is furthermore provided a ball or roller bearing which for purposes of an easy displacement is adapted to roll on the lateral surfaces of the beam pipe, the ball bearing or roller bearing being arranged in the receiving pipe or in the connecting flange.

The cardanic suspension of the test head is, in conformity with the present invention, effected by the fact that on one hand the cardan member is at the free end of the yoke perpendicularly to the displacement direction of the beam pipe limited as to its pivotal movement by abutments provided on the cardan member and that on the other hand the test head, having its longitudinal axis located in the extended longitudinal axis of the beam pipe, is mounted in the cardan member at a right angle with regard to the pivoting direction of the latter.

According to a further development of the invention it is suggested, at the lower end of the beam pipe and diametrically opposite to the connecting area of the unilateral yoke to provide a cable holder by means of which the play of the cable for the test head will be considerably facilitated when pivoting the latter.

Referring now to the drawings, in detail, FIG. 1 shows a connecting flange 1 which serves for mounting the entire holding device on the non-illustrated manipulator. The connecting flange 1 is firmly connected to receiving pipe 2 and by securing screws 3 is secured in axial direction and against accidental turning. In the lower portion of the receiving pipe 2 there are provided two ball bushings 4 and a spacer ring 5 located therebetween. The spacer ring 5 is secured against rotation by a safety screw 6. Screw 6 is in part located in a groove 7 of the connecting flange 1 and thus principally prevents the receiving pipe 2 from turning. In the ball bushings 4 there is longitudinally displaceably mounted a beam pipe 8 which is only partially shown. In the beam pipe 8 there is arranged a long pressure spring 9 which in part is guided against radial escape. The pressure spring 9 rests with one end against the upper end portion 10 of the receiving pipe 2 whereas its other end rests against the lower end portion of the beam pipe 8. The pressure spring 9 maintains the beam pipe 8 in the illustrated moved out position in which by means of a flange 11 it rests against an abutment 12 in the receiving pipe 2. In order also to be able to prevent the upper portion of the pressure spring 9 from bending radially, even when the beam pipe 8 is moved out, a guiding bolt 13 located in the pressure spring 9 is connected to the upper bottom portion 10. To prevent the beam pipe 8 from turning relative to the receiving pipe 10, the beam pipe 8 is equipped with a key 14 which has a length equalling the length of the stroke of the beam pipe. The key 14 engages a corresponding guiding means 15 of the connecting flange 1. During the displacement of the beam, ball bearings or roller bearings 16 roll on the lateral surfaces of key 14. The ball bearings or roller bearings 16 are held in the connecting flange 1; only one of these bearings being shown in FIG. 1 in dot-dash lines.

Called for by the construction, the ball bushings 4 and the spacer ring 5 are recessed in the displacement path of key 14 so that they do not represent closed rings. Finally, in the upper portion of the receiving pipe 2 there is provided a plurality of openings 17 for the inlet and outlet of air or water in order to prevent an increase in pressure or a suction effect in the interior of the container.

Figure 2:
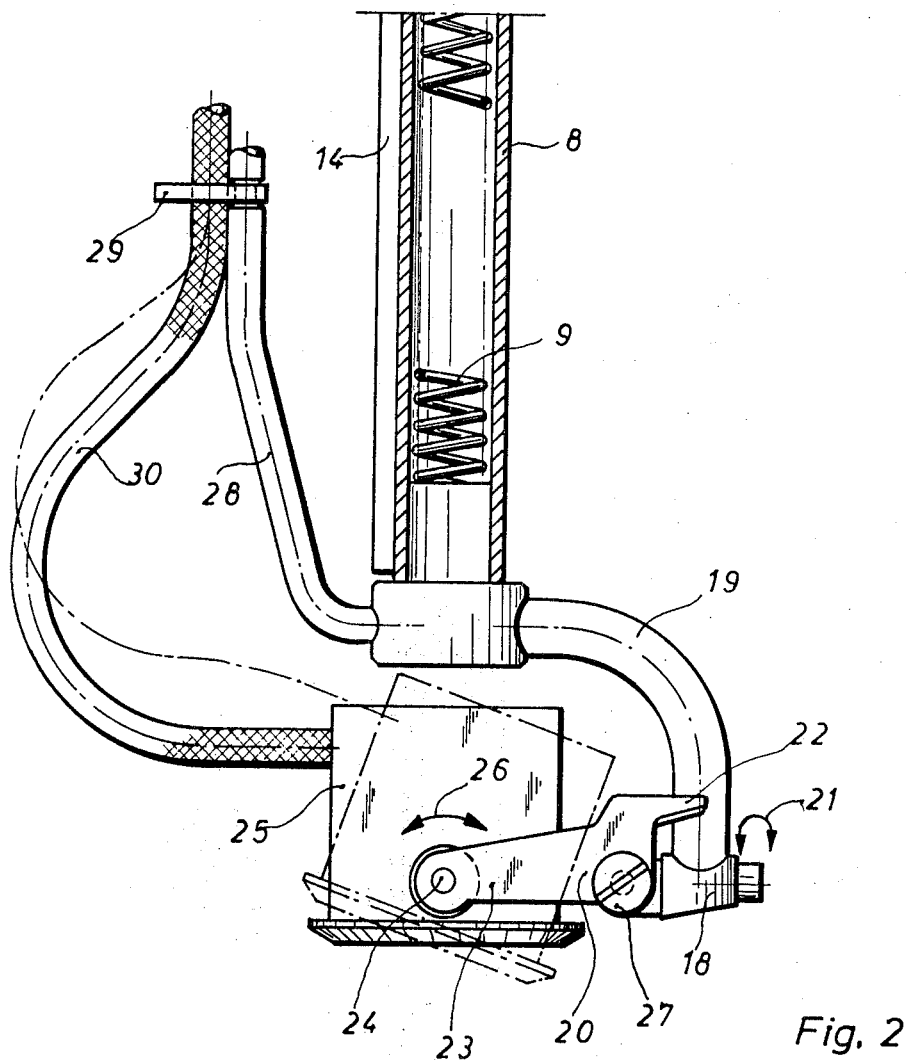
FIG. 2 illustrates the lower portion of the beam of FIG. 1 with a cardanic suspension of the test head.

As apparent from FIG. 2, at the lower end of the beam pipe 8, there is located a yoke 19 rigidly connected therewith and bent off by 90° and at the free end of which a bearing eyelet 18 is provided. The longitudinal axis of this bearing eyelet 18 extends at right angles to the longitudinal axis of the beam. and intersects therewith below the beam pipe 8. In the bearing eyelet 18 there is pivotally journalled a Cardan member 20 limited toward both sides in the direction of arrow 21. The limiting of the pivot path occurs by way of two abutments 22 provided on the Cardan member 20 and these abutments 22 surround the yoke 19 from both sides. According to the pivot direction of the Cardan member 20, there is noted that finally one of these abutments engages against the yoke 19. The Cardan member 20 provides two arm 23 extending in the direction of the longitudinal axis of the bearing eye 18 and in the free ends of the arms 23 there is provided respectively a bearing 24 for each thereof. The common longitudinal axis of the bearing means 24 extends at right angles to the axes of the beam and the bearing eyelet 18 and intersects therewith below the beam pipe 8. In the bearing means 24 finally the testing head 25 is pivotally held in the direction of the arrow 26. By way of a Cardan member 20 having a screw 27 laterally thereof provision is made that at least one of the arm means 23 can be removed and the testing head 25 accordingly can be interchanged. At the lower end of the beam pipe 8 there is further a cable holder 28 fastened therewith on which the cable 30 for the testing head 25 is held by means of a clip or clamp 29.

It is, of course, to be understood that the present invention is by no means limited to the specific showing in the drawings but also comprises any modifications within the scope of the appended claims.

What is claimed is:

1. A device for holding a testing head, especially an ultrasonic testing head, comprising: a beam having a first axial member adapted for connection to a support and a second axial member moveable relative to said first member along the axis of the beam, said second member having a free end remote from said first member, a yoke fixed to the free end of said second member, a holding member, first means supporting said holding member on said yoke for pivotal movement of said holding member about a first axis, second means on said holding member for supporting a testing head thereon for pivotal movement of the testing head about a second axis disposed at an angle to said first axis, and a spring acting between said first and second axial members and urging the said first and second axial members apart toward a position of maximum elongation of said beam, said spring having a substantially flat characteristic over the range of relative adjustability of said first and second axial members.

2. A device for holding a testing head, especially an ultrasonic testing head, comprising: a beam having a first axial member adapted for connection to a support and a second axial member moveable relative to said first member along the axis of the beam, said second member having a free end remote from said first member, a yoke fixed to the free end of said second member, a holding member, first means supporting said holding member on said yoke for pivotal movement of said holding member about a first axis, and second means on said holding member for supporting a testing head thereon for pivotal movement of the testing head about a second axis disposed at an angle to said first axis, said first axial member being in the form of a first length of pipe, said second axial member being in the form of a second length of pipe and telescopically engaging the inside of said first length of pipe, a support to which said first length of pipe is nonrotatably connected, and means on one of said first length of pipe and said support engaging said second length of pipe and preventing rotation thereof while permitting axial movement thereof.

3. A device according to claim 2 which includes a guide rod fixed to said first length of pipe and extending axially in said first and second lengths of pipe, said spring being disposed radially between said rod and said second length of pipe.

4. A device according to claim 2 which includes antifriction bearing means radially guiding said second length of pipe on said first length of pipe.

5. A device according to claim 4 in which said antifriction bearing means are disposed in circumferentially spaced relation between said first and second lengths of pipe.

6. A device according to claim 2 in which said means preventing rotation of said second length of pipe comprises an elongated axial key thereon, and stationarily mounted bearing means engaging the circumferentially opposite sides of said key.

* * * * *

UNITED STATES PATENT OFFICE
CERTIFICATE OF CORRECTION

Patent No. 3,824,843　　　　Dated July 23, 1974

Inventor(s) Johann Gebeshuber et al.

It is certified that error appears in the above-identified patent and that said Letters Patent are hereby corrected as shown below:

Assignee should read

-- Maschinenfabrik
   Augsburg-Nurnberg, --.

Signed and sealed this 29th day of October 1974.

(SEAL)
Attest:

McCOY M. GIBSON JR.
Attesting Officer

C. MARSHALL DANN
Commissioner of Patents